(12) United States Patent
Chen

(10) Patent No.: US 6,795,590 B1
(45) Date of Patent: Sep. 21, 2004

(54) SAR AND FLIR IMAGE REGISTRATION METHOD

(75) Inventor: Yang Chen, Westlake Village, CA (US)

(73) Assignee: HRL Laboratories, LLC, Malibu, CA (US)

( * ) Notice: Subject to any disclaimer, the term of this patent is extended or adjusted under 35 U.S.C. 154(b) by 335 days.

(21) Appl. No.: 09/668,657

(22) Filed: Sep. 22, 2000

(51) Int. Cl.[7] .................................... G06K 9/32
(52) U.S. Cl. ........................... 382/294; 382/280
(58) Field of Search .................. 382/294, 151, 382/154, 103, 280; 348/135, 139; 342/93, 451, 189, 191

(56) References Cited

U.S. PATENT DOCUMENTS

| | | | |
|---|---|---|---|
| 5,457,462 A | * 10/1995 | Mitsumoto et al. | 342/93 |
| 5,963,653 A | * 10/1999 | McNary et al. | 382/103 |
| 6,359,586 B1 | * 3/2002 | Sviestins | 342/451 |

OTHER PUBLICATIONS

Childs, M.B., Carlson, K.M., Pujara, N. "Transition from lab to flight demo for model–based flir atr and sar–flir fusion" Proceedings of the Society of Photo–Optical Instrumentation, vol. 4050, Apr. 26–28, 2000, pp. 294–305, XP008007802.

Shahbazian, E., Gagnon, L., Duquel, J–R., Macieszczak, M., Valin, P. "fusion of Imaging and Non–imaging data for surveillance aircraft" Proceedings of HTE Society of Phot–Optical Instrumentation, vol. 3067, Apr. 24–25 , 1997, pp. 179–189, XP008007793.

* cited by examiner

Primary Examiner—Yon J. Couso
(74) Attorney, Agent, or Firm—Tope-McKay & Associates

(57) ABSTRACT

There is disclosed herein, a method used to associate or correspond synthetic aperture radar (SAR) and forward looking infrared (FLIR) images. Based on feature points detectable from both images, a two stage approach is taken to address the issue of SAR and FLIR image registration: an initial registration stage where feature points detected from the FLIR image are transformed into the SAR image coordinates; and a residual registration stage where the SAR and FLIR feature points undergo a "Generalized Hough Transform" from which a maximal subset of matching feature points is obtained and the registration transformation can be derived. These two stages are separated into five steps which comprise the SAR and FLIR Image Registration Method: (1) extracting feature points from said SAR and FLIR images; (2) creating an initial registration of the FLIR image; (3) creating a two-dimensional residual registration utilizing a generalized Hough transform; (4) estimating the registration transformation; and, (5) verifying the registration. This method allows the residual registration to be done in a two-dimensional (rather than six) Hough transform, which results in fast and robust implementation as well as reduce the possibility of false registration.

6 Claims, 2 Drawing Sheets

SAR AND FLIR IMAGE REGISTRATION METHOD

FIELD OF THE INVENTION

The present invention relates to a method of solving the registration of two images. In particular, this invention relates to a two-stage method of solving the registration of a synthetic aperture radar (SAR) image and of a forward-looking infrared (FLIR) image.

BRIEF DESCRIPTION OF THE PRIOR ART

Traditional image registration systems rely on similarity between a pair of images to be registered in spatial distribution of the gray-levels using a variant of many correlation techniques. These approaches do not work when spatial gray-level distribution of the image changes between images due to different phenomenology employed by the imaging sensors, such as SAR and FLIR. Feature-based image registration techniques rely on some similarity between the extracted features (other than points) from the two images. Individual feature segments of one image can be matched against those from another using these extracted features. However, these kinds of features either rarely exist in both SAR and FLIR, or are very difficult to extract. Point-based registration techniques, on the other hand, exploit the specific configuration of a set of points in the image that satisfy the imaging models and sensor configurations under perspective transformation. This usually involves searching for a set of parameters in a multi-dimensional space, involving high computational complexity.

Registration is needed in a multi-sensor system (such as airborne sensors) to solve the correspondence or matching problem. Given a pair of SAR and FLIR images and the associated sensor models, at least 6 independent parameter values must be determined in order to register the two images. This is generally difficult without some prior knowledge about the sensor platforms (including the sensor models and the associated parameters, sensor positions and orientations). Theoretically, the two images can be registered if all the sensor parameters and sensor platform information is known. However in practice, even with the state-of-the-art sensor technology, registration is still needed due to errors and/or noise in the sensor systems or by nature of their operation. For SAR and FLIR image registration, this poses a special challenge, since there are hardly any commonly observable features in the SAR and FLIR images that can be used to correlate the two images.

Therefore, it is desirable to provide a method by which the SAR and FLIR images can be registered with low computational complexity and high robustness.

SUMMARY OF THE INVENTION

This invention relates to a method of solving the registration of a synthetic aperture radar (SAR) image and of a forward-looking infared (FLIR) image based on feature points detectable from both images. The method is distinguished by two stages: an initial registration stage and a residual registration stage. In the initial registration, feature points detected from the FLIR image are transformed into the SAR image coordinates. In the residual registration stage, the set of feature points from SAR and that from FLIR undergo a generalized Hough transform (GHT) from which a maximal subset of matching points is obtained and the registration transformation can be derived. The method in the present invention allows the second stage residual registration, with the method used in the first stage, to be done in a two-dimension (2-D) GHT, rather than in higher dimensions.

Using available sensor parameters and sensor location information, the registration task can be separated into 5 steps: (1) detecting feature points from both the SAR and the FLIR image; (2) transforming the feature points from the FLIR image into the SAR image using known sensor parameters and sensor platform information; (3) carrying out the GHT for the set of SAR feature points and the set of transformed FLIR feature points in 2-D translation domain, and select the maximal subset of the matching feature points from the GHT; (4) computing the updated registration transformation; and (5) evaluating the registration transformation. As a result, the present invention provides both an image registration transformation that aligns the SAR and the FLIR and a set of corresponding point pairs between the SAR and the FLIR images. The reduction of registration search space involved in the registration is from six to two dimensions. Consequences of this reduction include a substantial reduction in the possibility of false registration and robust registration against noise and error introduced during data collection This method also works in cases where the matching set of feature points constitute only a very small portion of the total feature point population in both SAR and FLIR images, with the rest being caused by random clutter in the scene.

DETAILED DESCRIPTION OF THE INVENTION

Figure 1:
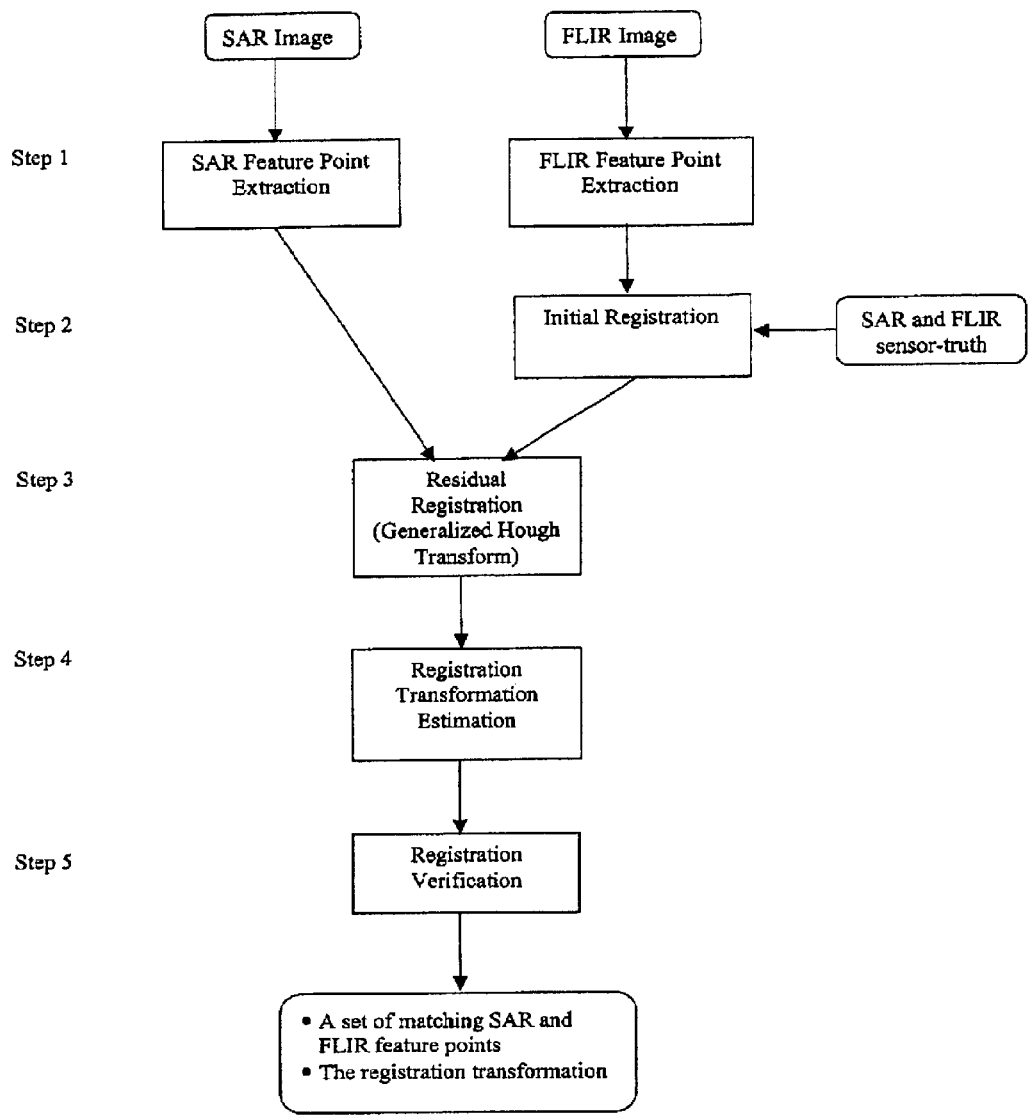
FIG. 1 is a schematic diagram depicting the system diagram for the SAR and FLIR image registration method.

This invention relates to a method for solving the registration of a SAR image and a FLIR image by using feature points extracted from both images. The method of this invention is described below as process involving five distinct steps, as shown in FIG. 1. The necessary input to this invention lies in feature points described in Step 1 below, and the output of this invention includes 1) the correspondence of the feature points from SAR and FLIR images; and 2) a registration transformation for transforming any point in the FLIR image into the SAR image.

Step 1: Feature Point Extraction

Feature points are first extracted from both SAR and FLIR images by using one of the well-known algorithms such as the constant false-alarm rate (CFAR) detector. The requirement for feature points to be used in this invention is that they must represent certain points detectable from both the SAR and the FLIR, and can be located similarly in both images. An example of such feature points is the location of certain objects in the scene. In target detection/recognition applications, feature points can optionally have target-likeness measures attached. Step 1 assumes that the two images have overlap in the space they cover and that common feature points can be detected from both images. If these assumptions are not true, then the registration will fail and the situation can be detected in Step 3 or 5. There is a parameter in feature extraction called windows size w, which determines, among other things, how close two detected features can be (measured in image pixels). The window size is determined by the nature of the features in the image (such as object size). We use a window size of w=21 for SAR in the following description. The window size for FLIR is not directly related to the current invention.

Step 2: Initial Registration

Initial registration is the process of transforming the feature points detected in the FLIR image into the ground plane coordinate frame of the SAR image, using available (possibly with noise and error) sensor truth data The sensor truth data includes sensor parameters (including, but not limited to, resolution for SAR and FLIR and the focal length for the FLIR), and the sensor position information (location of the sensors, plus azimuth, pitch, and roll angles for the FLIR). To transform the FLIR feature points into SAR, a FLIR sensor-imaging model is created in a homogeneous coordinate system:

$$\begin{bmatrix} uX \\ uY \\ u \end{bmatrix} = \begin{bmatrix} 1 & 0 & 0 \\ 0 & 1 & 0 \\ 0 & 0 & -1/f \end{bmatrix} P \qquad \text{Eq. (1)}$$

where P is a three-dimensional (3-D) point in the camera coordinate frame representing the point being imaged, (X, Y) is the image of P, u is a scaling factor, and f is the camera focal length. P can be represented by its coordinates $(x, y, z)^t$ in a reference frame, W, as follows:

$$P = R_r R_d R_a \left( \begin{bmatrix} x \\ y \\ z \end{bmatrix} - \begin{bmatrix} t_x \\ t_y \\ t_z \end{bmatrix} \right) \qquad \text{Eq. (2)}$$

where $R_r$, $R_d$ and $R_a$ are 3 by 3 orthonormal rotation matrices representing the roll angle $\theta_r$, the depression angle $\theta_d$, and the azimuth angle $\theta_a$ of the camera frame relative to the reference frame, and $(t_x, t_y, t_z)^t$ is the position vector of the origin of the camera frame in the reference frame W.

For simplicity, in the rest of this section, we assume that the reference frame is such that its XOY plane coincides with the SAR image ground plane, its X and Y axes coincide with the X and Y axes of the SAR image, respectively, and its Z axis points upwards. Assuming that all points of interest that the FLIR camera sees lie on a ground plane with z=h in the chosen reference frame, Equations (1) and (2) can be solved for x and y, resulting in a back-projection transformation from an image point (X, Y) to a 3-D point (x, y, z):

$$x = \frac{A_1 X + A_2 Y + A_3}{A_7 X + A_8 Y + A_9}, \; y = \frac{A_4 X + A_5 Y + A_6}{A_7 X + A_8 Y + A_9}, \; z = h \qquad \text{Eq. (3)}$$

where
$A_1 = \cos(\theta_d)\sin(\theta_r)t_x + (h-t_z)(\sin(\theta_a)\sin(\theta_d)\sin(\theta_r) - \cos(\theta_a)\cos(\theta_r))$
$A_2 = -\cos(\theta_d)\cos(\theta_r)t_x - (h-t_z)(\sin(\theta_a)\sin(\theta_d)\cos(\theta_r) + \cos(\theta_a)\sin(\theta_r))$
$A_3 = f(\sin(\theta_d)t_x - \sin(\theta_a)\cos(\theta_d)(h-t_z))$
$A_4 = \cos(\theta_d)\sin(\theta_r)t_y + (h-t_z)(\sin(\theta_a)\cos(\theta_r) + \cos(\theta_a)\sin(\theta_d)\sin(\theta_r))$
$A_5 = \cos(\theta_d)\cos(\theta_r)t_y + (h-t_z)(\sin(\theta_a)\sin(\theta_d)\sin(\theta_r) - \cos(\theta_a)\sin(\theta_d))$
$A_6 = f(\sin(\theta_d)t_y - \cos(\theta_a)\cos(\theta_d)(h-t_z))$
$A_7 = \cos(\theta_d)\sin(\theta_r)$
$A_8 = -\cos(\theta_d)\cos(\theta_r)$
$A_9 = f \sin(\theta_d)$ We apply the back-projection transformation of Equation (3) to each feature point in the FLIR image. Then these back-projected feature points can be simply scaled into the SAR image coordinates as follows:

$$\begin{bmatrix} xs \\ ys \end{bmatrix} = c \begin{bmatrix} x \\ y \end{bmatrix} \qquad \text{Eq. (4)}$$

where $(x, y)^t$ is the back-projection of the FLIR feature point in the reference frame W, (xs, ys) is the back-projection in the SAR image, and c is a constant reflecting the resolution of the SAR image. In the remaining discussion, we will refer to the mathematical transformation involving both Equations (3) and (4) together as the "back-projection." Let $\{(xs_i, ys_i)\}$, $i=1, \ldots, N$ be the set of back-projected FLIR feature points, and $\{(xr_i, yr_i)\}$, $i=1, \ldots, M$ be the set of SAR feature points. The registration problem now is to match a subset of $\{(xs_i, ys_i)\}$ with a subset of $\{(xr_i, yr_i)\}$. If accurate measurements of the sensor truth is available, a subset of $\{(xs_i, ys_i)\}$ will map exactly onto the corresponding subset of $\{(xr_i, yr_i)\}$, assuming the detection locations are precise and the related assumptions mentioned before are true. In reality, however, sensor truth data is often not accurate due to noise and measurement errors. The noise and error in measurements can cause residual registration errors so that a SAR feature point and the back-projected FLIR feature point do not align exactly even if they correspond to the same feature point in the scene. Therefore, solving the general problem of matching such two sets of feature points involves searching in a parameter space of at least six dimensions (three for rotation and 3 for translation) to account for the measurement errors and noise. This is assuming the sensor parameters (sensor resolutions and focal length) can be accurately measured.

Step 3: Residual Registration

Parameter Search Space Reduction

Equation (3) represents a general formula that performs the back-projection of any image point into a 3-D point. An in-depth analysis of the relationship between changes in the sensor truth and the outcome of the back-projections of the FLIR feature points $(xs, ys)^t$ shows that, when the distance from the FLIR camera to the center of the FLIR field-of-view (FOV) is far larger relative to the size of the area covered by the FLIR FOV, the residual registration error is predominantly caused by changes in the depression angle $\theta_d$ and the azimuth angle $\theta_a$. Changes in other sensor truth values only cause relatively small changes in the back-projection and are negligible. For example, a small change in camera roll angle $\theta_r$ causes skew in the resulting back-projection, and small changes in camera location cause small changes in translation in the back-projection. Furthermore, the change in location of the back-projection of the FLIR feature points due to inaccuracies in depression angle $\theta_d$ and azimuth angle $\theta_a$, can be modeled approximately as a pure translation. In other words, the misregistration of the two sets of feature points can be solved in 2-D, because the two subsets of feature points (one from the SAR and one from the FLIR after back-projection) that correspond to the same physical feature points only differ in location by a translation.

To solve this 2-D translation, only one pair of feature points is required: one each from the SAR and FLIR images. Unless we know the correspondence (which point in SAR corresponds to which point in FLIR), which we don't, this method cannot be used. Besides, replying on only one pair of points is neither accurate nor robust. We need to use all available feature points. We need to find both the correspondences of the feature points and the translation that will eliminate the residual registration error. The GHT can help solve both problems at the same time. In our GHT implementation, a 2-D accumulation array is set up with array indices measuring the translation between the SAR feature points and the corresponding back-projected FLIR feature points. We enumerate all possible pairs of feature points from SAR and FLIR For each such pair, we calculate the translation needed to bring them into registration, and cast one vote in the GHT accumulation array using the translation as the index. In the end, the GHT accumulation array element with the highest score (which combines the number of votes and other factors. See below for definition.) represents the correct translation, and the set of feature points which voted for the element makes up the matching point set. The GHT is chosen to accomplish this task because it is a non-iterative approach, very simple to implement, and most importantly, robust against noise. The "noise" includes both the position errors in the detected feature points, and the undesired feature points due to clutter, which do not have correspondence in the other image. The GHT implementation is more thoroughly described below:

Generalized Hough Transform (GHT)

Size of the GHT Accumulation Array

Figure 2:
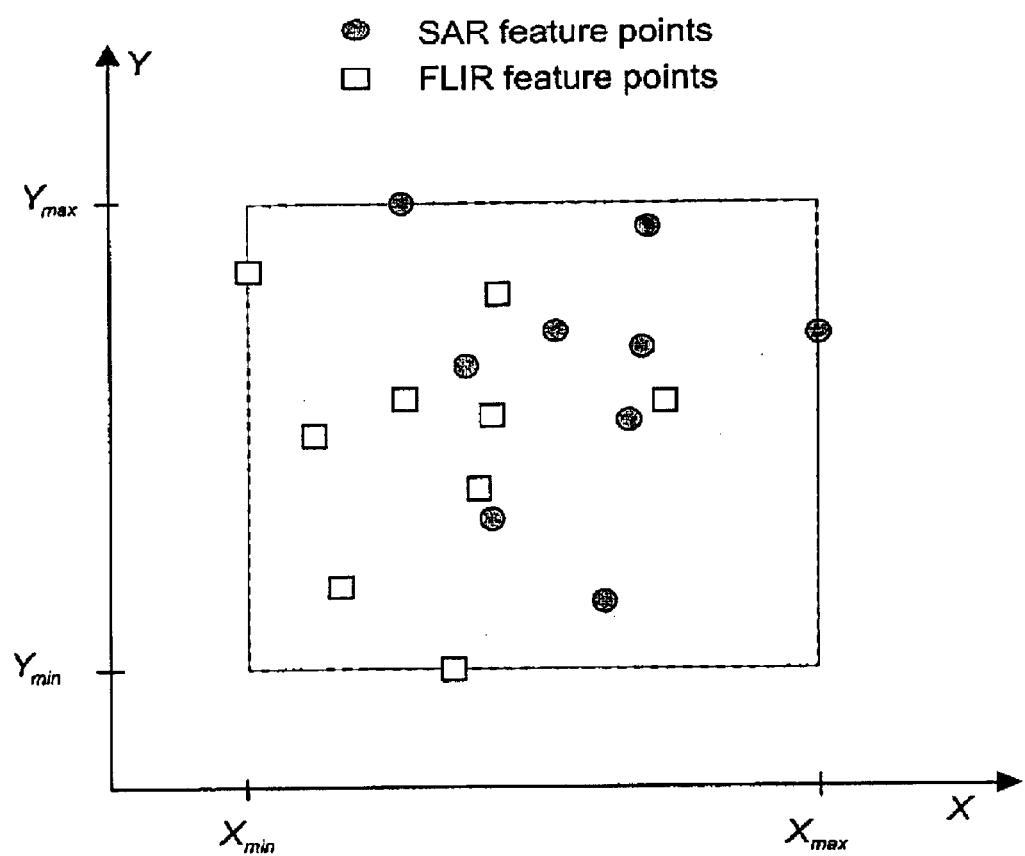
FIG. 2 is a graph depicting the span of the back-projected FLIR feature points and the SAR feature points, which determines the size of a Generalized Hough Transform accumulation array.

The array size is determined by the span of the back-projected FLIR feature points and the SAR feature points, as shown in FIG. 2. The GHT array will be of size $(X_{max}-X_{min})/q+1$ by $(Y_{max}-Y_{min})/q+1$, where q is the quantization unit (that is, the cells in the accumulation array represent squares of a size q by q). The quantization unit q is determined according to the window size w (see page 4, line 1): $q=\lceil w/4 \rceil$, where $\lceil x \rceil$ is the smallest integer greater than x.

To increase memory efficiency in GHT, in case the clouds of SAR feature points and the back-projected FLIR points are far from each other, we can shift one set of feature points (say that back-projected from FLIR) before constructing the accumulation array so that the two sets occupy roughly the same space. This can be done, for example, by calculating the centers of gravity of both sets of points and forcing them to align with each other by shifting the back-projected FLIR points. This approach reduces total span of the feature points and therefore the size of the accumulation array. However, we need to take this extra shift into account when we calculate the actual translation in figuring out the residual registration. Let the total shift added to the back-projected FLIR points to accomplish this be denoted as $(\Delta x_g, \Delta y_g)$.

The GHT Algorithm

1. Let C be a 2-D array of appropriate size. Each element in C represents a q by q square in the translation parameter space, where q is a quantization unit. Set all elements in C to zero (0).

2. Let $\{(xs_i, ys_i)\}$, i=1, ..., N be the set of back-projected FLIR feature points, and $\{(xr_j, yr_j)\}$, i=1, ..., M be the set of SAR feature points. Perform the following iterations:

for each $(xs_i, ys_i)$, $i = 1$ to $N$ for each $(xr_j, yr_j)$, $j = 1$ to $M$ $(dx, dy) \leftarrow ((xs_i - xr_j)/q, (ys_i - yr_j)/q)$ $(Dx, Dy) \leftarrow (\lfloor dx \rfloor, \lfloor dy \rfloor)$ $C(Dx, Dy) \leftarrow C(Dx, Dy) + 1$ -continued $C(Dx-1, Dy) \leftarrow C(Dx-1, Dy) + 1$ $C(Dx, Dy-1) \leftarrow C(Dx, Dy-1) + 1$ $C(Dx-1, Dy-1) \leftarrow C(Dx-1, Dy-1) + 1$ end end where $\lfloor x \rfloor$ is the largest integer smaller than x. In this step, each pair of SAR and FLIR feature points cast votes in multiple adjacent cells. Therefore in effect the accumulation cells have overlapping coverage. This is also equivalent to convolving the resulting accumulation array, from casting one vote for each pair, with a kernel of 2 by 2 containing all 1.0's. The use of overlapping cells prevents from the situation in which the true translation is located on or near the boundaries of two or more cells. This situation causes votes being split among the nearby cells and can result in a wrong solution.

3. Let L be a list of accumulation cells whose vote count is greater than zero and whose location standard deviation $\sigma_t$ (defined below) are less than a set threshold $T_1$. Compute the scores for each cell in the list L.

The score of each accumulation cell is a function of a) the number of votes; and b) the likelihood of the feature points (from both images) voting for the cell being from a set of objects with common features. For this invention, the score is defined as the sum of FLIR feature strength of all the pairs in the cell. The FLIR feature strength is in turn the average contrast of a FLIR feature against its background. The score function can also include feature strength from SAR. The purpose of this "scoring function" is to rank the results of the GHT. The location standard deviation $\sigma_t$ is the geometric mean of the standard deviation of dx and dy for the votes in a given cell: $\sigma_t = \sqrt{\sigma_x^2 + \sigma_y^2}$, where $\sigma_x$ and $\sigma_y$ are the standard deviations of dx and dy, respectively. The threshold for the location standard deviation is set to $$T_1 = \frac{2}{3} q,$$

where q is the cell quantization unit. The constant, 2/3, is used to maintain high confidence in the results obtained. Consequently, the use of location standard deviation effectively screens the results of GHT.

4. Let (dxm, dym) be the indices for the cell in L with the maximum score.

5. If the vote count K in C at (dxm, dym), K=C(dxm, dym), is less than 4 (i.e., C(dxm, dym)<4), then report failure and quit. Otherwise report success and set of pairs voted for the cell at (dxm, dym) constitutes the matching solution.

Step 4: Registration Transformation Estimation

As the result of GHT in the last step, we get a set of matching pairs of feature points from SAR and FLIR. With this set of matching points we can estimate the registration transformation that we can use to transform any point (not only the points in the matching set) in the FLIR image into the SAR image. We describe two methods for estimating the registration transformation.

Least-Squares Method

With a set of four or more pairs of matching feature points, we can easily estimate the registration transformation between the SAR and FLIR images using a least-squares method. Substituting Equation (4) into (3), and normalize the coefficients, we get the following equations for transforming the FLIR image points into the SAR images:

$$xr = \frac{B_1 X + B_2 Y + B_3}{B_7 X + B_8 Y + 1}, yr = \frac{B_4 X + B_5 Y + B_6}{B_7 X + B_8 Y + 1} \quad \text{Eq. (5)}$$

where (X, Y) are the coordinates of the FLIR feature points, (xr, yr) are the coordinates of the corresponding SAR feature points, and $$B_n = \begin{cases} cA_n/A_g, & n = 1, \ldots, 6 \\ A_n/A_g, & n = 7, 8 \end{cases} \quad \text{Eq. (6)}$$

where c and $A_n$, n=1, . . . ,8 are defined in Equations (4) and (3), respectively. After rearranging the terms in Equation (5), we get $$\begin{cases} B_1 X + B_2 Y + B_3 - xr(B_7 X + B_8 Y + 1) = 0 \\ B_4 X + B_5 Y + B_6 - yr(B_7 X + B_8 Y + 1) = 0 \end{cases} \quad \text{Eq. (7)}$$

Each pair of matching points gives two simultaneous linear equations in the form of Equation (7). To solve for the eight parameters $B_1$ to $B_8$ in Equation (7), at least 4 pairs of matching points are required. When we have 4 or more pairs of matching points, we can find the least-squares solution for the parameters $B_1$ to $B_8$ which minimizes the following error term:

$$E = \sum_{i=1}^{K} (e_{xi}^2 + e_{yi}^2) \quad \text{Eq. (8)}$$

where K is the number of point pairs, and $e_{xi}$ and $e_{yi}$ are the error terms based on Equation (7).

$$\begin{aligned} e_{xi} &= B_1 X_i + B_2 Y_i + B_3 - xr_i(B_7 X_i + B_8 Y_i + 1) \\ e_{yi} &= B_4 X_i + B_2 Y_i + B_3 - xr_i(B_7 X_i + B_8 Y_i + 1) \end{aligned}, i = 1, \ldots, K \quad \text{Eq. (9)}$$

Inverse Jacobian Method

The least-squares method given above solves the 8 parameters of the transformation from scratch using a set of matching point pairs. Since we already have the initial registration transformation given by Equation (3), we can also find the final registration transformation by updating the initial transformation using the set of matching point pairs found in the GHT. As discussed in "parameter search space reduction" in Step 3, the residual registration error is caused mainly by the errors in the depression angle $\theta_d$ and the azimuth angle $\theta_a$. Therefore we start with building a relation between the residual registration error and the two angles involved. We define the following Jacobian matrix:

$$J = \begin{bmatrix} \frac{\partial xr}{\partial \theta_d} & \frac{\partial xr}{\partial \theta_a} \\ \frac{\partial yr}{\partial \theta_d} & \frac{\partial yr}{\partial \theta_a} \end{bmatrix} \quad \text{Eq. (10)}$$

J is the Jacobian matrix of (xr, yr) in Equation (3) with respect to the two rotational parameters, the depression and the azimuth angles $\theta_d$ and $\theta_a$, respectively. We compute the updates to these two parameters by:

$$\begin{bmatrix} \Delta \theta_d \\ \Delta \theta_a \end{bmatrix} = J^{-1} \begin{bmatrix} \Delta x \\ \Delta y \end{bmatrix} \quad \text{Eq. (11)}$$

where ($\Delta$x, $\Delta$y) is the residual translational registration error, and $J^{-t}$ is the inverse of the Jacobian matrix. ($\Delta$x, $\Delta$y) can be determined by averaging the dx's and dy's for all the votes in the cell (dxm, gym) from the result of GHT in Step 3:

$$\begin{bmatrix} \Delta x \\ \Delta y \end{bmatrix} = K \begin{bmatrix} \sum_{i=2}^{K} dx_i \\ \sum_{i=1}^{K} dy_i \end{bmatrix} + \begin{bmatrix} \Delta x_g \\ \Delta y_g \end{bmatrix} \quad \text{Eq. (12)}$$

where K=C(dxm, dym) is the number of votes in the accumulation array at (dxm, dym), $dx_t$ and $dy_t$, i=1, . . . ,K, are the components of translation for the pairs of feature points at (dxm, dym), and $\Delta x_g$ and $\Delta y_g$ are the global shift we applied to the back-projected FLIR points (see page 9, line 13).

After updating $\theta^d$ and $\theta_a$ in the sensor truth data according Equations (11) and (I2), the transformation parameters $B_1$ to $B_8$ can be recomputed by computing the parameters of $A_1$ to $A_9$ in Equation (3), plus z=h (where h is the ground plane elevation). In our experiments, h=0 was used. But h should be substituted with known terrain elevation for the imaged area. Once $A_1$ to $A_9$ have been computed, the coefficients $B_1$ to $B_8$ for the transformation illustrated in Equation (5) can be derived according to Equation (6).

Step 5: Registration Verification

The registration verification step has two purposes. One is to ensure that the set of matches (the pairs of SAR and FLIR feature points) are indeed geometrically plausible. The second is to pick up additional possible matches or drop out some erroneous matches. The verification is done by first transforming all the FLIR feature points into the SAR image using the newly estimated parameters $B_1$ to $B_8$ in Step 4 according to Equation (5). Then for each transformed FLIR point, a search is done for the closest SAR feature point within a distance in of 4 (pixels) in both X and Y directions. Again, the number 4 is preferably used to maintain high confidence. If such a SAR feature point is found, then the pair of FLIR and SAR feature points will be added to the new matched point list.

Once the verification is done, the new matched point list is checked to determine whether it contains more than 4 points. If yes, then the registration is complete. If not, then the registration has failed.

What is claimed is:

1. A method for obtaining a set of matching feature points from SAR and FLIR images, comprising the following steps:

extracting feature points from SAR and FLIR images;

creating an initial registration of said FLIR image with respect to the SAR image;

determining a set of matching feature points by utilizing a generalized Hough transform on the extracted feature points from the SAR and FLIR images;

estimating a registration transformation based on the set of matching feature points; and then, verifying the registration using the estimated registration transformation.

2. A method for obtaining a set of matching feature points from SAR and FLIR images as recited in claim 1, wherein the extracting step comprises:

using an algorithm such as a constant false-alarm rate (CFAR) detector.

3. A method for matching feature points from said SAR and FLIR images as recited in claim 1, wherein the SAR image has a ground plane and X, Y, and Z axes, wherein the FLIR image has a ground plane and X, Y, and Z axes, and wherein the step of creating an initial registration comprises:

using a homogeneous coordinate system:

$$\begin{bmatrix} uX \\ uY \\ u \end{bmatrix} = \begin{bmatrix} 1 & 0 & 0 \\ 0 & 1 & 0 \\ 0 & 0 & -1/f \end{bmatrix} P \quad \text{Eq. (1)}$$

where P is a three-dimensional (3-D) point in a camera coordinate frame having an origin and representing a point being imaged, (X, Y) is the image of P, u is a scaling factor, and f is a camera focal length;

representing P by its coordinates $(x, y, z)^t$ in a reference frame, W, having a XOY plane, as follows:

$$P = R_r R_d R_a \left( \begin{bmatrix} x \\ y \\ z \end{bmatrix} - \begin{bmatrix} t_x \\ t_y \\ t_z \end{bmatrix} \right) \quad \text{Eq. (2)}$$

where $R_r$, $R_d$ and $R_a$ are 3 by 3 orthonormal rotation matrices representing a roll angle $\theta_r$, a depression angle $\theta_d$, and an azimuth angle $\theta_a$ of the camera coordinate frame relative to the reference frame, and $(t_x, t_y, t_z)^t$ is a position vector representing the origin of the camera coordinate frame in the reference frame W;

assuming that the reference frame is such that its XOY plane coincides with the SAR image ground plane, its X and Y axes coincide with X and Y axes of the SAR image, respectively, and its Z axis points upwards relative to the image ground plane, and that all points in the FLIR images lie on a ground plane with z=h representing a ground plane elevation relative to the reference frame W;

solving for x and y, resulting in a back-projection transformation from an image point (X, Y) to a 3-D point (x, y, z):

$$x = \frac{A_1 X + A_2 Y + A_3}{A_7 X + A_8 Y + A_9}, \quad y = \frac{A_4 X + A_5 Y + A_6}{A_7 X + A_8 Y + A_9}, \quad z = h \quad \text{Eq. (3)}$$

where
$A_1 = \cos(\theta_d)\sin(\theta_r)t_x + (h-t_z)(\sin(\theta_a)\sin(\theta_d)\sin(\theta_r) - \cos(\theta_a)\cos(\theta_r))$
$A_2 = -\cos(\theta_d)\cos(\theta_r)t_x - (h-t_z)(\sin(\theta_a)\sin(\theta_d)\cos(\theta_r) + \cos(\theta_a)\sin(\theta_r))$
$A_3 = f(\sin(\theta_d)t_x - \sin(\theta_a)\cos(\theta_d)(h-t_z))$
$A_4 = \cos(\theta_d)\sin(\theta_r)t_y + (h-t_z)(\sin(\theta_a)\cos(\theta_r) + \cos(\theta_a)\sin(\theta_d)\sin(\theta_r))$
$A_5 = \cos(\theta_d)\cos(\theta_r)t_y + (h-t_z)(\sin(\theta_a)\sin(\theta_r) - \cos(\theta_a)\sin(\theta_d)\cos(\theta_r))$
$A_6 = f(\sin(\theta_d)t_y - \cos(\theta_a)\cos(\theta_d)(h-t_z))$
$A_7 = \cos(\theta_d)\sin(\theta_r)$
$A_8 = -\cos(\theta_d)\cos(\theta_r)$
$A_9 = f\sin(\theta_d)$ applying the back-projection transformation of Equation (3) for each feature point in the FLIR image;

scaling the back-projected feature points into the SAR image coordinates as follows:

$$\begin{bmatrix} xs \\ ys \end{bmatrix} = c \begin{bmatrix} x \\ y \end{bmatrix}, \quad \text{Eq. (4)}$$

where $(x, y)^t$ is the back-projection of the FLIR feature point in the reference frame W, (xs, ys) is the back-projection in the SAR image, and c is a constant reflecting the resolution of the SAR image; and then, generating $\{(xs_i, ys_i)\}$, i=1, ..., N as a set of back-projected FLIR feature points, and $\{(xr_i, yr_i)\}$, i=1, ..., M as a set of SAR feature points.

4. A method for matching feature points from SAR and FLIR images as recited in claim 3, wherein the step of determining a set of matching feature points is performed by:

determining an array size from the span of the back-projected FLIR feature points and the SAR feature points;

having a Generalized Hough Transform array of size $(X_{max}-X_{min})/q+1$ by $(Y_{max}-Y_{min})/q+1$, where q represents a quantization unit;

determining the quantization unit q according to a window size w: $\lceil w/4 \rceil$, where $\lceil x \rceil$ is the smallest integer greater than x; and then, using the five-step Generalized Hough Transform (GHT) to determine the set of matching feature points.

5. A method for matching feature points from SAR and FLIR images as set forth in claim 1, wherein the estimation step comprises:

using a Least-Squares Method or, alternatively, an Inverse Jacobian Method; and then, updating said registration transformation using an Inverse Jacobian Method.

6. A method for matching feature points from SAR and FLIR images as set forth in claim 1, wherein the SAR images each comprise a plurality of feature points, with each feature point comprised of pixels, with each pixel represented by x and y coordinates, wherein the FLIR images each comprise a plurality of feature points, with each feature point comprised of pixels, with each pixel represented by x and y coordinates, and wherein the verification step comprises:

transforming all of the FLIR feature points into SAR coordinates using a Least-Squares Method or, alternatively, an Inverse Jacobian Method to generate a set of newly estimated parameters $B_1$ to $B_8$;

performing a search for the closest SAR feature point to each transformed FLIR feature point within a distance of 4 pixels in both x and y coordinates;

adding the pairs of FLIR and SAR feature points to the two-dimensional residual registration if such SAR feature points are found; and then, checking the two-dimensional residual registration, and determining the registration to be complete when it contains more than 4 points.

* * * * *